Oct. 15, 1929.    A. W. PLATT    1,731,319
STOWING MECHANISM
Filed Feb. 13, 1928    2 Sheets-Sheet 1
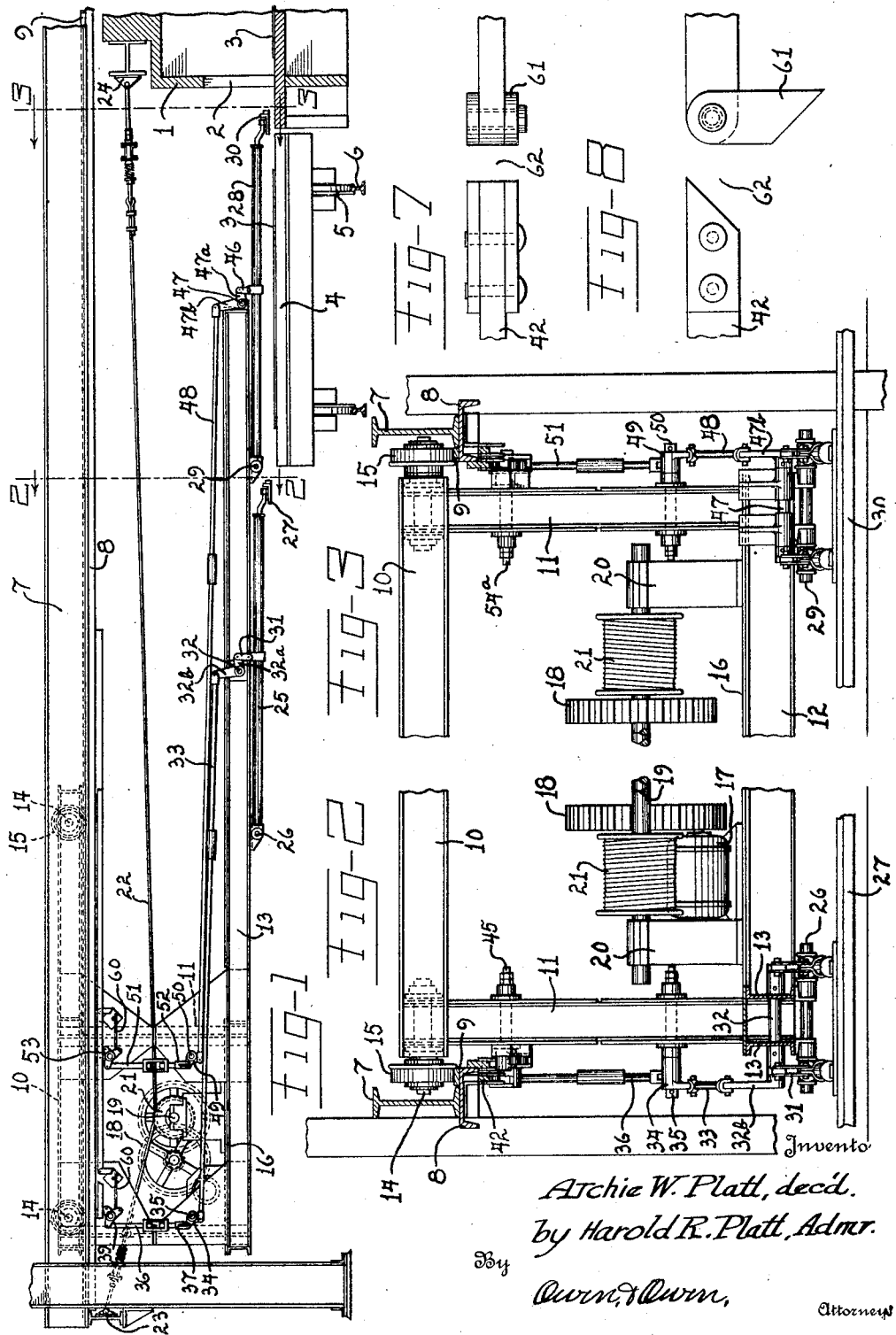

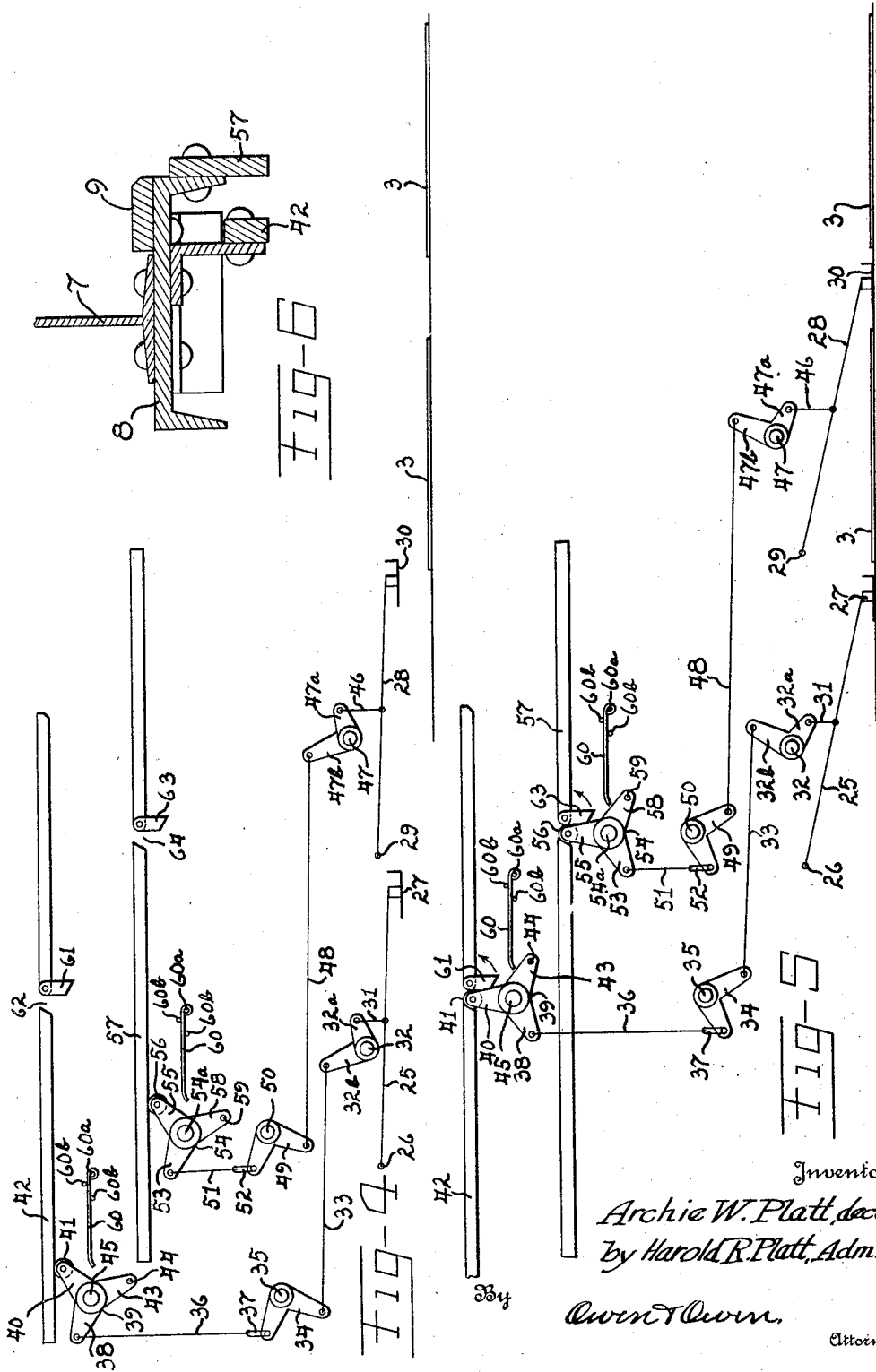

Patented Oct. 15, 1929

1,731,319

UNITED STATES PATENT OFFICE

ARCHIE W. PLATT, DECEASED, LATE OF TOLEDO, OHIO, BY HAROLD R. PLATT, ADMINISTRATOR, OF TOLEDO, OHIO, ASSIGNOR TO THE EDWARD FORD PLATE GLASS CO., OF ROSSFORD, OHIO, A CORPORATION OF OHIO

STOWING MECHANISM

Application filed February 13, 1928. Serial No. 253,940.

This invention relates to a stowing mechanism for handling plate glass or the like while in the plastic state. Its general object is to provide improved means for controlling the movement of the stowing tool, whereby the transference of the plates by successive stages from the table into and through the leer is greatly facilitated.

A more specific object is to provide means for lowering the tool into position to engage the edge of the glass and to move it over a supporting surface during the active stroke of the tool, and means for raising the tool above the plane of the glass during its return movement. This makes it possible to combine two or more tools, one arranged in rear of another and operated simultaneously, and to arrange several ovens in line.

The specific construction of the invention, its mode of operation, and the advantages resulting therefrom will be more particularly explained in connection with the accompanying drawings illustrating the same.

In the drawings:

Figure 1 is a side elevation of a stowing mechanism constructed according to the invention, the adjacent end of the leer being shown in section.

Fig. 2 is a partial cross section taken on the line 2—2 of Fig. 1 and illustrating the means for guiding and operating the rear stowing tool.

Fig. 3 is a partial cross section taken on the line 3—3 of Fig. 1 and showing the means for guiding and operating the front stowing tool.

Fig. 4 is a diagrammatic view illustrating the position of the stowing mechanism at the beginning of its forward movement.

Fig. 5 is a diagrammatic view illustrating the position of the stowing mechanism as the stowing tools are lowered preparatory to engaging the glass.

Fig. 6 is an enlarged cross sectional view of one set of tracks for guiding the movements of the stowing tools.

Fig. 7 is a plan view of one of the track switches.

Fig. 8 is a side elevation of the switch shown in Fig. 7.

The invention, as illustrated, is associated with the charging end 1 of a leer having a door 2 through which the glass plates 3, while still in the plastic state, are introduced into the first oven from a table 4. There will usually be a series of these tables supported by wheels 5 on tracks 6 and adapted to receive the glass as it is delivered from the rolls.

The stowing mechanism is supported by a suitable overhead runway which in its present embodiment comprises I-beams 7 with channel-beams 8 secured to their lower faces and supporting tracks 9 on which a carriage 10 is guided for movement to and fro. This carriage includes vertical side beams 11 connected by transverse beams 12 and by longitudinal beams 13. The carriage 10 is provided with stub axles 14 carrying wheels 15 which ride on the tracks 9.

The lower beams 12 and 13 support a platform 16 on which is mounted a motor 17. This motor is connected by a train of speed reduction gearing 18 to a shaft 19 which is journaled in suitable blocks 20 mounted on the platform 16. Drums 21 are secured to the shaft 19 and wrapped around each of these drums is a cable 22. One end of this cable is anchored, as at 23, to the structure which supports the runway and it is anchored at its other end, as at 24, at a point above the front end of the leer. The motor is reversible and at the will of the operator may be operated to wind the cables about the drums 21 in one direction or the other to advance or retract the carriage 10.

The beams 13 extend forwardly from the carriage for a considerable distance and support one or more stowing tools. As shown in the drawings, the rear stowing member comprises booms 25 mounted at their rear ends on shafts 26 carried by the beams 13 and supporting a tool 27 at their front ends. The front stowing member comprises booms 28 pivoted at their rear ends on shafts 29 mounted on the beams 13 and carrying a tool 30 at their front ends.

For controlling the up and down movement of the tool 27, each boom 25 is connected between its ends by a link 31 to an arm 32ᵃ secured to a shaft 32 which is journaled transversely of the carriage. Another arm 32ᵇ extends from the shaft 32 at an angle to the arm 32ᵃ and is connected by a rod 33 to a bell crank 34 which is fulcrumed at 35 on the carriage. A link 36 has at one end a pin and slot connection 37 with the bell crank 34 and has at the other end a connection with one arm 38 of a three-armed lever 39 which is supported at 45 on the carriage. Another arm 40 of the lever 39 carries a roller 41 which rides along the underside of a track 42 mounted on the channel beam 8. The third arm 43 of the lever 39 carries a pin or roller 44 at its free end, the purpose of which will be hereinafter more fully explained.

For controlling the up and down movement of the tool 30 the intermediate portion of each boom 28 is connected by a link 46 to an arm 47ᵃ secured to a shaft 47 which is journaled transversely of the carriage. Another arm 47ᵇ extends from the shaft 47 at an angle to the arm 47ᵃ and is connected by a rod 48 to a bell crank 49 fulcrumed at 50 on the carriage. A connecting rod 51 has at one end a pin and slot connection 52 with the bell crank 49 and is connected at its other end to one arm 53 of a three-armed lever 54 which is centrally pivoted, as at 54ᵃ, to the carriage. A second arm 55 of this lever carries a roller 56 which engages the underside of a track 57. The third arm 58 carries a pin or roller 59 at its free end.

In front of each three-armed lever, a spring 60 is mounted at one end on a pin 60ᵃ and extends toward the lever between pins 60ᵇ.

As illustrated in Figs. 1 and 4, with the carriage moving forwardly the roller arms 40 and 55 are inclined forwardly and upwardly with the rollers engaging the tracks 42 and 57 respectively to maintain the tools 27 and 30 in raised position. The track 42 is provided with a switch 61 which is normally open, leaving a gap 62 into which the roller 41 may ride. Likewise, the track 57 is provided with a switch 63 normally leaving a gap 64 into which the roller 56 may ride. As the carriage advances, therefore, until the rollers 41 and 56 ride into the respective gaps this allows lever 38 and 53 to swing downwardly until the tools 27 and 30 engage the surface on which the glass rests. This position is illustrated in Fig. 5.

As the carriage continues to move forwardly, the arms 43 and 58 swing upwardly until the pins 44 and 59 engage the respective springs 60, placing them under tension. As the rollers 41 and 56 reach the ends of their respective tracks the tension of the springs 60 causes the roller arms to swing upwardly past the ends of the tracks, so that as the carriage begins its return movement the arms 40 and 55 trail behind and are disposed at the same angle as during the first part of their advance movement, as shown in Fig. 4. As the rollers reach the switches 61 and 63 in their retractive movement the switches close and permit the rollers to continue their movement rearwardly.

It will be seen, therefore, that when the stowing mechanism moves forwardly as above described, both tools will be raised until the front tool passes over the first plate and the tools will then be lowered simultaneously so that two plates may be separately engaged and moved forwardly at the same time, as indicated in Fig. 5. When the stowing mechanism has completed its forward movement and starts backwardly both tools are simultaneously raised and held in raised position, as shown in Fig. 4, until they are withdrawn from the oven.

Upon further retractive movement, the roller 41 passes beyond the end of track 42, permitting the tool 27 to rest upon the surface of the casting table while the tool 30 is still raised. Then as the carriage again moves forwardly the tool 27 transfers the next plate from the casting table into the first oven. This second forward stroke is completed when the roller 41 reaches the gap 62 and, as the carriage is again retracted, both tools are raised and withdrawn from the oven to their initial position, preparatory to a repetition of the first described operation.

From the foregoing description, it will be seen that the stowing mechanism herein described is simple and economical in construction and efficient in its operation. While one embodiment of the invention has been shown and described, and its mode of operation, in considerable detail, it is apparent that the same may be modified to a considerable extent without departing materially from the scope of the appended claims.

What is claimed is:

1. In a stowing mechanism, the combination with a carriage and means for moving the carriage forwardly and backwardly for a predetermined distance, of a tool supporting member mounted on said carriage and movable upwardly and downwardly between two limiting positions, a track adjacent the path of the carriage, and means cooperating with said track for maintaining said member in its uppermost position during a definitely predetermined portion of the carriage travel, and for maintaining said member in its lowermost position during the remainder of the carriage travel.

2. In a stowing mechanism, the combination with a carriage and means for moving the carriage forwardly and backwardly for a predetermined distance, of a tool supporting member mounted on said carriage, a track adjacent the path of the carriage, and means cooperating with said track for automatically moving said supporting member upwardly at one point in its travel and downwardly at another point in its travel, and for preventing upward or downward movement of said member at any other point.

3. In a stowing mechanism, the combination with a carriage and means for moving the carriage forwardly and backwardly for a predetermined distance, of a tool supporting member mounted on said carriage, means for moving said member upwardly and maintaining it in that position during all of the movement of the carriage in one direction and part of its movement in the other direction, and means for moving said member downwardly and maintaining it in down position during the remaining part of the carriage travel in the last mentioned direction.

4. In a stowing mechanism, the combination with a carriage and means for moving the carriage forwardly and backwardy, of a tool supporting member mounted on said carriage, means for automatically moving said member upwardly at the completion of the forward movement of the carriage and for maintaining said member in that position during all of its rearward movement and during the first part of its forward movement, and means for automatically moving said member downwardly at an intermediate point in its forward movement and maintaining it in that position until the forward movement is completed.

5. In a stowing mechanism, the combination with a carriage and means for moving said carriage forwardly and backwardly for a predetermined distance, of a forwardly projecting stiff arm pivotally connected at its rear end to the carriage, means for limiting pivotal movement of the arm both upwardly and downwardly, a track adjacent the path of the carriage, a switch connected with said track, and means cooperating with said track and switch for maintaining said arm in its uppermost position during a predetermined portion of its travel, for automatically shifting said arm to its lowermost position at the conclusion of such portion of its travel, and for maintaining said arm in its lowermost position during the remainder of its travel.

6. In a stowing mechanism, the combination with a carriage and means for moving said carriage forwardly and backwardly for a predetermined distance, of a forwardly projecting stiff arm pivotally connected at its rear end to the carriage, means for limiting the pivotal movement of the arm both upwardly and downwardly, a track adjacent the path of the carriage, a switch connected with said track, and means cooperating with said track and switch for automatically swinging said arm upwardly at one point in its travel and downwardly at another point in its travel, and for preventing pivotal movement of said arm at any other point.

7. In a stowing mechanism, the combination with a carriage and means for moving said carriage forwardly and backwardly, of a forwardly projecting stiff arm pivotally connected at its rear end to the carriage, means for swinging said arm upwardly and maintaining it in that position during all of its longitudinal movement in one direction and part of its longitudinal movement in the other direction, and means for swinging said arm downwardly and maintaining it in down position during the remaining part of its movement in the last mentioned direction.

8. In a stowing mechanism, the combination with a carriage and means for moving said carriage forwardly and backwardly, of a forwardly projecting stiff arm pivotally connected at its rear end to the carriage, means for automatically swinging said arm upwardly at the completion of its forward travel and for maintaining it in that position during all of its rearward movement and during the first part of its forward movement, and means for automatically swinging said arm downwardly at an intermediate point in its forward travel and maintaining it in that position until the forward travel is completed.

9. In a stowing mechanism, the combination with a carriage and means for moving said carriage forwardly and backwardly, of a stiff arm pivotally connected at its rear end to said carriage, a member pivotally mounted on the carriage and having three radial arms, means for limiting the pivotal movement of said stiff arm, link mechanism connecting one of said radial arms to the stiff arm at a distance from the rear end thereof, and means cooperating with the other two radial arms to shift said stiff arm upwardly at one point in its travel and downwardly at another point and for preventing pivotal movement of the stiff arm at any other point.

10. In a stowing mechanism, the combination with a carriage and means for moving said carriage forwardly and backwardly, of a stiff arm pivotally connected at its rear end to said carriage, a member pivotally mounted on the carriage and having three radial arms, link mechanism connecting one of said radial arms to the stiff arm at a distance from the rear end thereof, a track on which the second radial arm is guided, and means cooperating with the second and third radial arms for rocking said member to shift said stiff arm upwardly at one point in its travel and downwardly at another point and for preventing pivotal movement of the stiff arm at any other point.

11. In a stowing mechanism, the combination with a carriage and means for moving said carriage forwardly and backwardly for a predetermined distance, of a stiff arm pivotally mounted on said carriage, a track, a control member mounted on the carriage and riding on the track and operatively connected to said stiff arm, and means in the path of said control member for shifting its relative position at predetermined points to swing the stiff arm upwardly and downwardly respectively.

12. In a stowing mechanism, the combination with a carriage and means for moving said carriage forwardly and backwardly, of a stiff arm pivotally mounted on said carriage, a track, a control lever pivotally mounted on the carriage, means operatively connecting the lever with said stiff arm to control the movement of the latter about its pivot, said lever having an arm riding on said track and held at an oblique angle thereto, means for rocking said lever at a certain point in its travel to change said angle and swing said stiff arm downwardly, and means for returning said lever at another point in its travel to swing said stiff arm upwardly.

13. In a stowing mechanism, the combination with a carriage and means for moving said carriage forwardly and backwardly, of a track adjacent the path of said carriage, a lever pivoted to said carriage and having an arm engaging said track, said arm being inclined forwardly from its pivot toward the track during a portion of the travel of said carriage in one direction, means for then reversing the position of the lever so that it inclines rearwardly during the remainder of the travel of the carriage in that direction, and means for then restoring the position of the lever and holding it in that position during all of the return travel.

14. In a stowing mechanism, the combination with a carriage and means for moving said carriage forwardly and backwardly, of a tool mounted on said carriage and relatively movable to either one of two positions, a control lever, means connecting said lever with said tool to control the position of the latter, a track on which the lever is guided in either one of two positions to maintain the tool in its corresponding position, and a switch connected with said track and operable to shift said lever from one position to another as it passes said switch in one direction but not when it passes in the other direction.

15. In a stowing mechanism, the combination with a carriage and means for moving said carriage forwardly and backwardly, of a tool mounted on said carriage and relatively movable to either one of two positions, a control lever, means connecting said lever with the tool to control the position of the latter, a track on which the lever is guided in either one of two positions to maintain the tool in its corresponding position, means for shifting the control lever from one position to the other at the completion of its travel in one direction, and a switch connected with said track and effective during the travel of said carriage in one direction but not in the other direction, to again shift the lever.

16. In a stowing mechanism, the combination with a carriage and means for moving the carriage forwardly and backwardly for a predetermined distance, of a plurality of like tool supporting members mounted on said carriage with one member projecting in advance of the other and both simultaneously movable upwardly and downwardly between two limiting positions, means for maintaining said members in their uppermost position during a definitely predetermined portion of their longitudinal travel, and means for maintaining said members in their lowermost position during the remainder of their travel.

17. In a stowing mechanism, the combination with a carriage and means for moving the carriage forwardly and backwardly, of a plurality of like tool supporting members mounted on said carriage with one member projecting in advance of the other and both movable upwardly and downwardly between two limiting positions, means for simultaneously moving said members upwardly at one point in the travel of the carriage and downwardly at another point in its travel, and means for preventing upward or downward movement of said members at any other point.

18. In a stowing mechanism, the combination with a carriage and means for moving the carriage forwardly and backwardly, of a plurality of like tool supporting members mounted on said carriage with one member projecting in advance of the other and both movable upwardly and downwardly between two limiting positions, means for simultaneously moving said members upwardly and maintaining them in that position during all of the travel of the carriage in one direction and part of its travel in the other direction, and means for simultaneously moving said members downwardly and maintaining them in down position during the other part of the carriage travel in the last mentioned direction.

19. In a stowing mechanism, the combination with a carriage and means for moving the carriage forwardly and backwardly, of a plurality of like tool supporting members mounted on said carriage with one member projecting in advance of the other and both movable upwardly and downwardly, means for simultaneously moving said members upwardly at the completion of the forward movement of the carriage and for maintaining them in that position during all of the rearward travel and during the first part of the forward travel, and means for simultaneously moving said members downwardly at an intermediate point in their forward movement and maintaining them in that position until the forward travel is completed.

In testimony whereof I have hereunto signed my name to this specification.

HAROLD R. PLATT,
*Administrator of the Estate of Archie W. Platt, Deceased.*